United States Patent [19]
Li et al.

[11] Patent Number: 5,931,934
[45] Date of Patent: Aug. 3, 1999

[54] METHOD AND APPARATUS FOR PROVIDING FAST INTERRUPT RESPONSE USING A GHOST INSTRUCTION

[75] Inventors: Stephen (Hsiao Yi) Li, Garland; Jonathan Rowlands, Dallas; Fuk Ho Pius Ng, Plano, all of Tex.

[73] Assignee: Texas Instruments Incorporated, Dallas, Tex.

[21] Appl. No.: 08/850,431

[22] Filed: May 2, 1997

[51] Int. Cl.$^6$ ...................................................... G06F 9/46
[52] U.S. Cl. ................... 710/260; 710/1; 710/5; 710/6; 710/20; 710/59; 369/32; 369/47; 369/48; 369/54; 369/124; 360/32
[58] Field of Search .................. 369/32, 47, 54, 369/48, 124; 360/32; 395/826, 821, 825, 840, 872, 879, 733; 710/1, 5, 6, 20, 59, 260

[56] References Cited

U.S. PATENT DOCUMENTS

| | | | |
|---|---|---|---|
| 5,237,667 | 8/1993 | Murakami et al. | 395/375 |
| 5,373,493 | 12/1994 | Iizuka | 369/124 |
| 5,584,039 | 12/1996 | Johnson et al. | 395/826 |
| 5,640,598 | 6/1997 | Sato et al. | 395/842 |
| 5,657,454 | 8/1997 | Benbassat et al. | 375/242 |
| 5,748,835 | 5/1998 | Lee | 386/104 |

OTHER PUBLICATIONS

MPEG–1, 3–11172.
MPEG–2, Information Technology—Generic Coding of Moving Pictures and Audio: Audio ISO/IEC 13818–3, $2^{nd}$ Edition, Feb. 20, 1997 (ISO/IEC JTC1/SC29/WG11 N1519), Int 'l Org. for Standardisation Coding of Moving Pictures and Audio.

Digital Audio Compression Standard (AC–3), Dec. 20, 1995, Advanced Television Systems Committee, ATSC Standard.

TI–17424A (S.N. 08/475,251), allowed, Integrated Audio Decoder System and Method of Operation.

TI–17600 (S.N. 08/054,127), allowed, System Decoder Circuit with Temporary Bit Storage and Method of Operation.

TI–24442P (S.N. 60/030,106), filed Provisionally Nov. 1, 1996. Integrated Audio/Video Decoder Circuitry.

*Primary Examiner*—Ayaz R. Sheikh
*Assistant Examiner*—Frantz Blanchard Jean
*Attorney, Agent, or Firm*—Gerald E. Laws; Robert D. Marshall, Jr.; Richard L. Donaldson

[57] ABSTRACT

A data processing device 100 uses a portion of a random access memory 111 as an input buffer for holding a portion of a stream of data which is received by an input interface 130. Likewise, a portion of a memory 121 is used as an output buffer for holding a portion of processed data which is output by an output interface 140. A processing unit 110 within the processing device manages the flow of input and output data. The input interface asserts an I/O request 860 when it receives a data word, and the output interface asserts an I/O request 870 when it needs a data word. In response to an I/O request, fast interrupt circuitry inserts a ghost instruction which is formed by doppelganger circuitry into an instruction sequence which is being accessed from a ROM 112. The ghost instruction performs the requested data transfer.

19 Claims, 9 Drawing Sheets

METHOD AND APPARATUS FOR PROVIDING FAST INTERRUPT RESPONSE USING A GHOST INSTRUCTION

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then down-sampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention a data processing device is provided which performs direct memory access (DMA) transfers using fast interrupts. The device has an I/O port that generates a request signal when a data word is ready for transfer into a memory circuit within the device. An instruction processing unit within the device is operable to process a sequence of instructions of various types, including an I/O instruction for transferring a data word between the I/O port and the memory circuit. Fast interrupt circuitry receives the request signal and inserts a ghost instruction, which is a likeness of an I/O instruction, into the sequence of instructions so that the processing device performs a DMA transfer by executing the ghost instruction.

In another form of the present invention, doppelganger circuitry which is part of the fast interrupt circuitry forms different types of ghost instructions to perform DMA transfers with several ports.

In another form of the present invention, breakpoint circuitry detects when the end of a selected region of the memory has been reached and asserts a breakpoint interrupt in order to allow an interrupt routine to reset an address index used during DMA transfers in order to create a circular buffer in the memory circuit.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
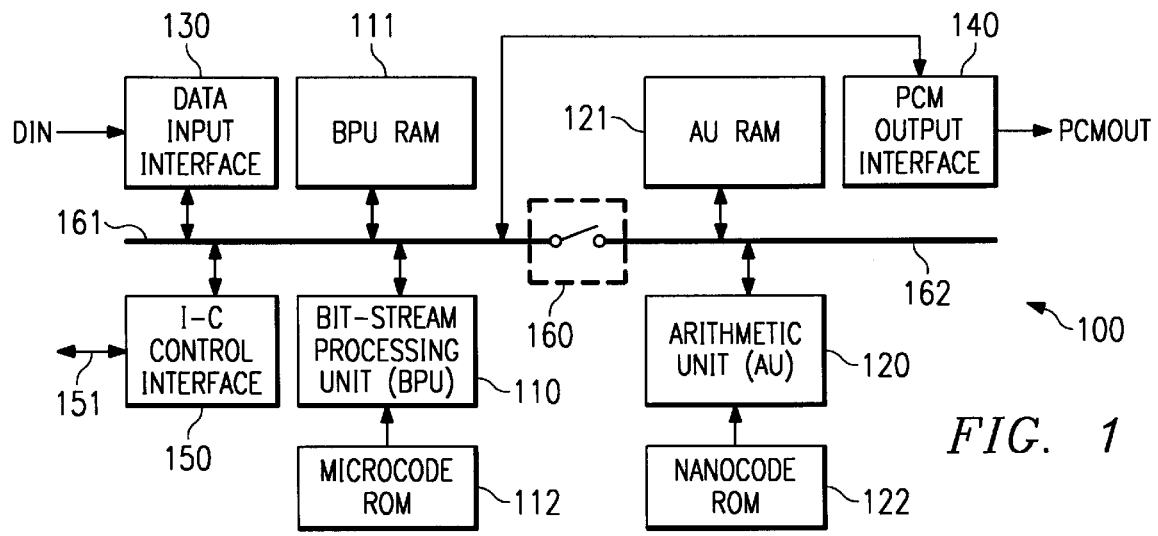
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
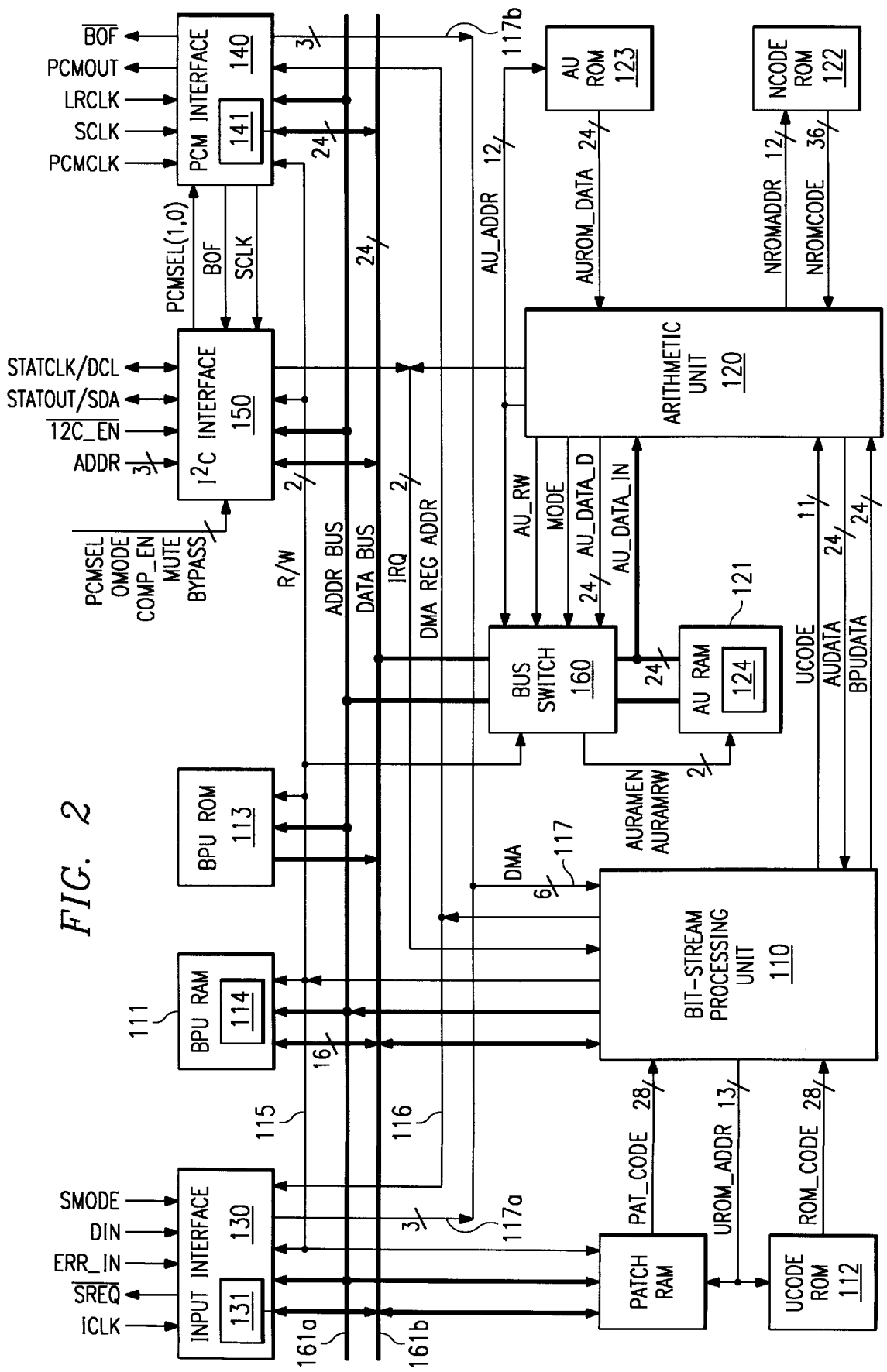
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
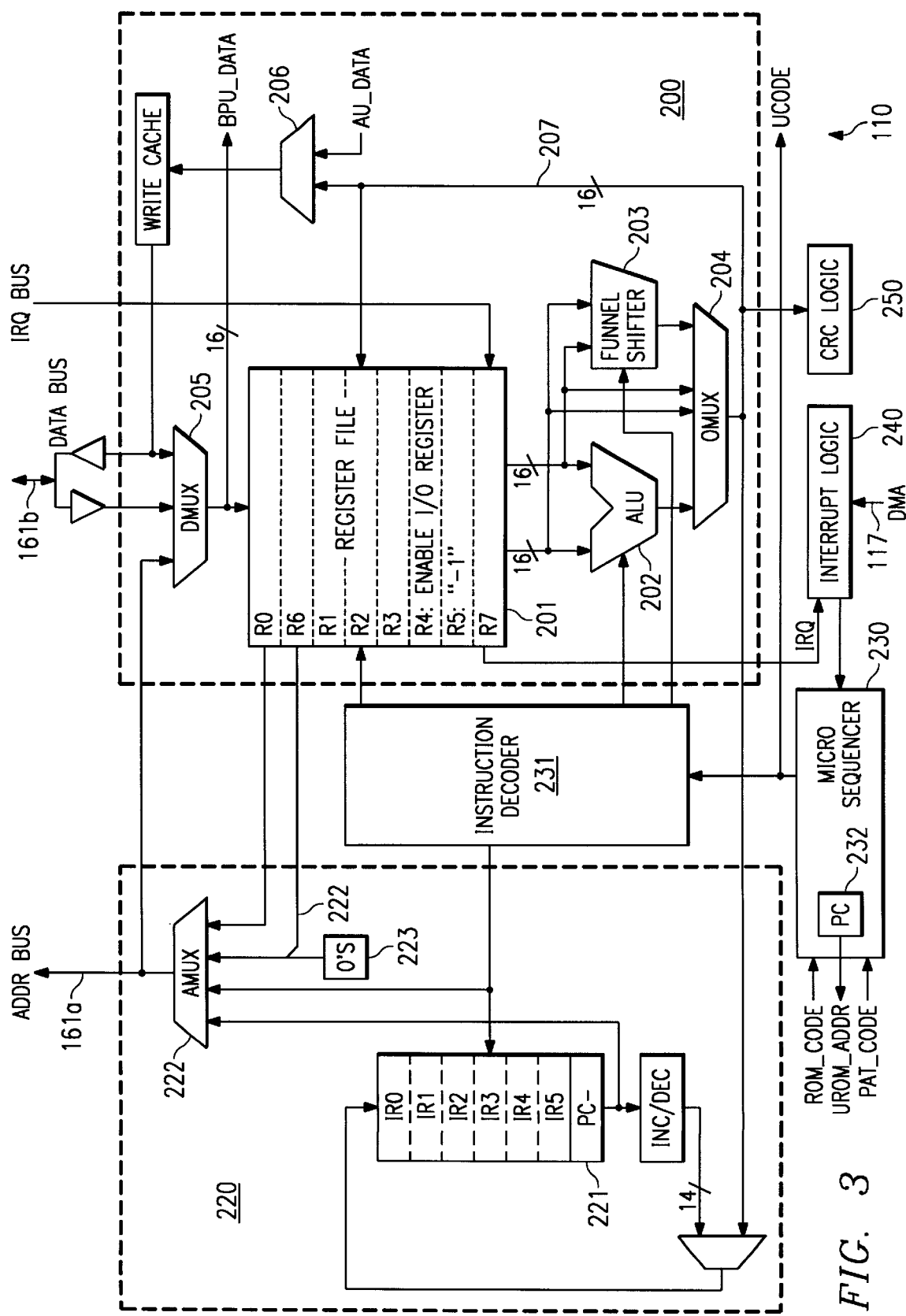
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel. Operational unit 200 includes a register file 201 an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

BPU Instruction Set

| Instruction Mnemonics | Functional Description |
| --- | --- |
| And | Logical and |
| Or | Logical or |
| cSat | Conditional saturation |
| Ash | Arithmetic shift |
| LSh | Logic shift |
| RoRC | Rotate right with carry |
| GBF | Get bit-field |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
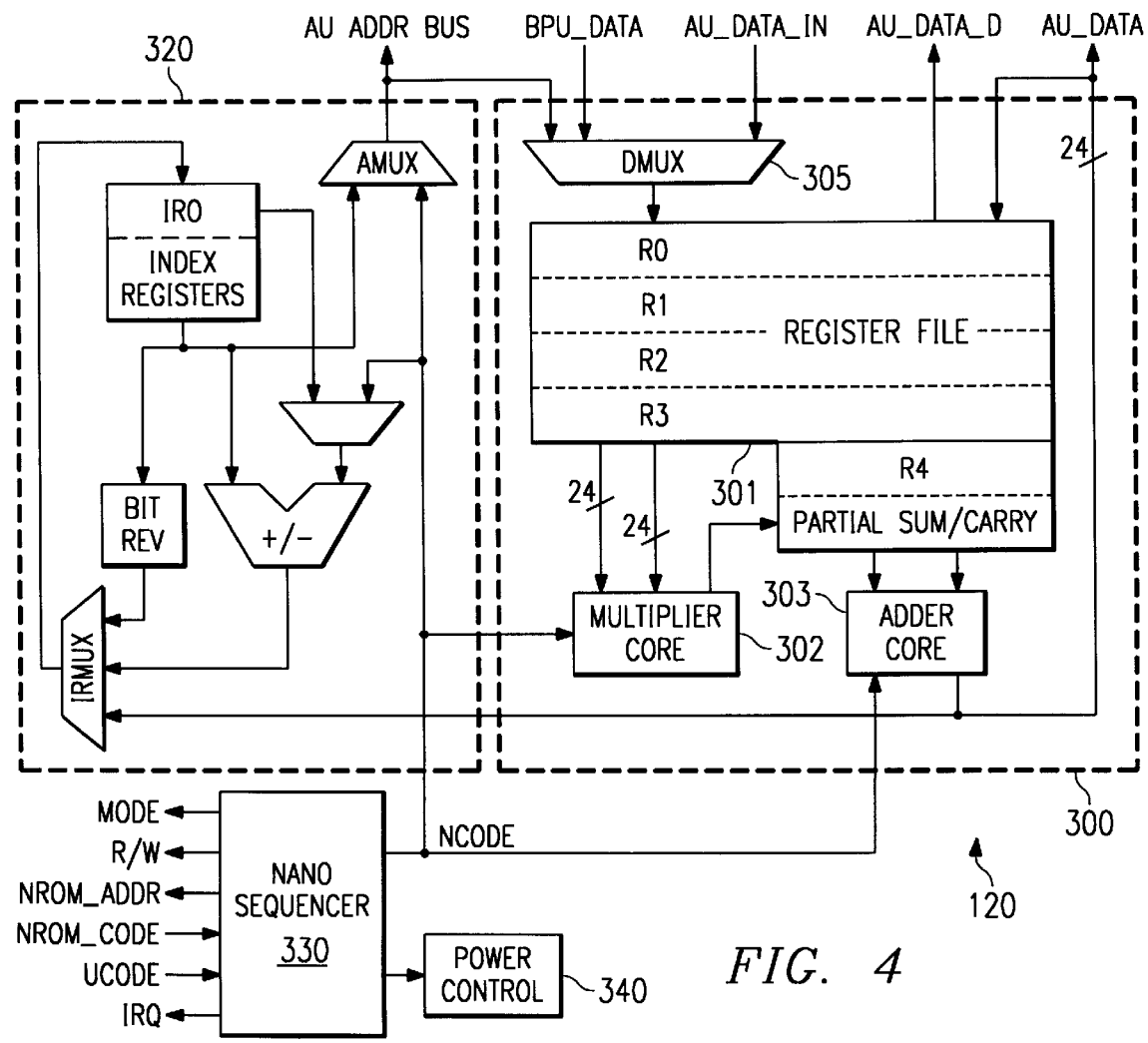
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310, U.S. Pat. No. 5,657,423 both assigned to the assignee of the present application), which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality after processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
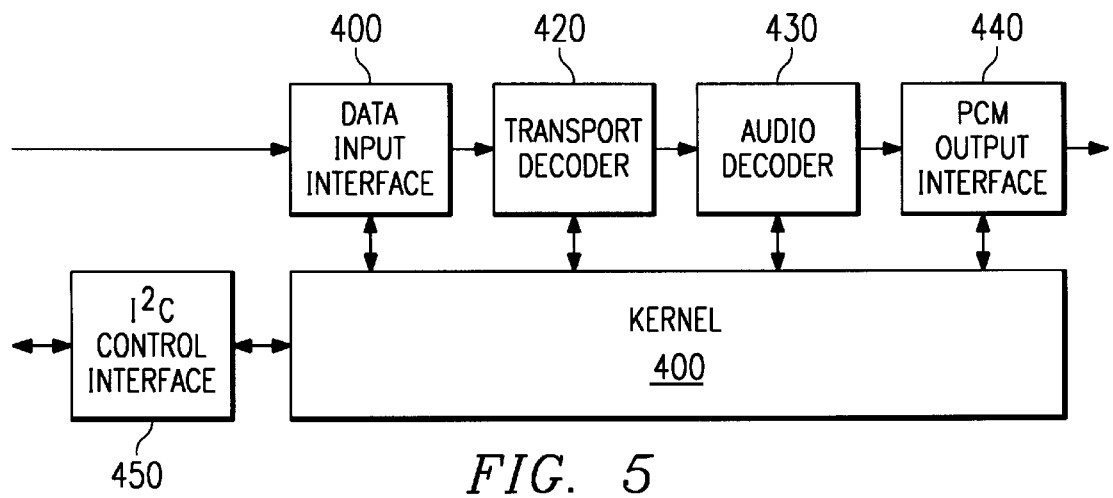
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multitasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. I$^2$C Control Interface 450 accepts configuration commands from an external host and reports device status. Finally, Kernel 400 responds to hardware interrupts and schedules task execution.

Figure 6:
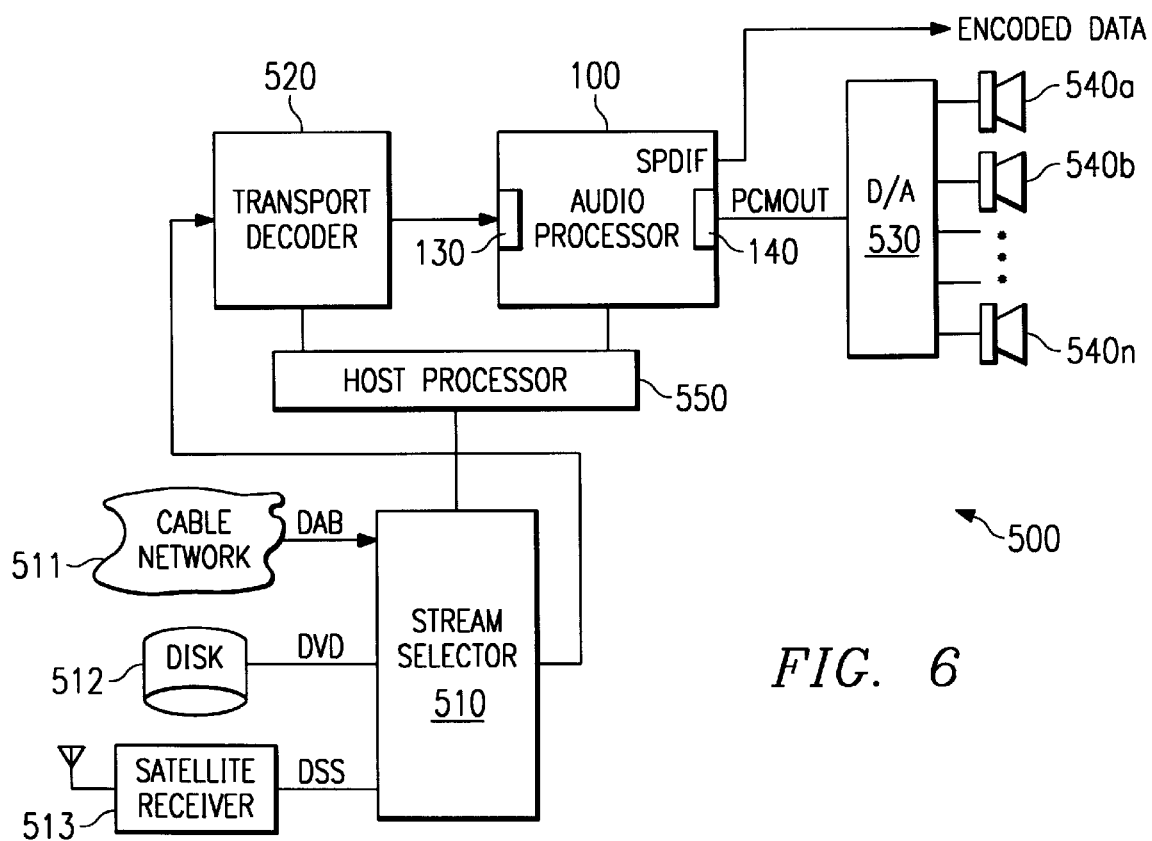
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite ystem (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540a. Typically, A/D 530 forms two channels of analog data for stereo output into two speaker subsystems 540a and 540b. Processing device 100 is programmed to downmix an MPEG-2 or AC-3 system with more than two channels, such as 5.1 channels, to form only two channels of PCM data for output to stereo speaker subsystems 540a and 540b.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540a–n. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
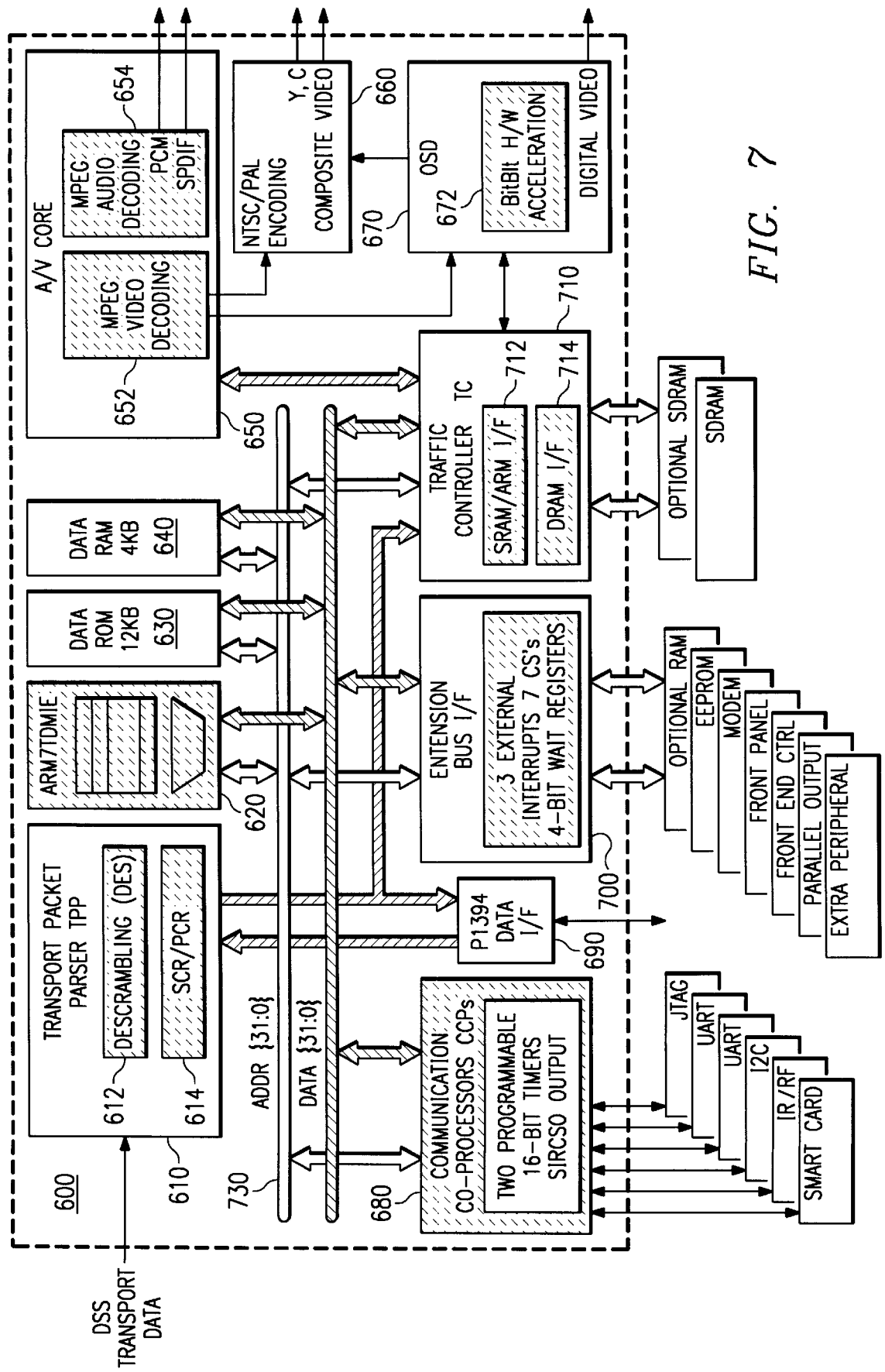
FIG. 7 is a block diagram of an integrated circuit which includes the data processing device of FIG. 1 in combination with other data processing devices, the integrated circuit being connected to various external devices.

Referring now to FIG. 7 there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (ANV) core block 650 that includes an MPEG-2 audio decoder 654 and an MPEG-2 video decoder 652, an NTSC/PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an I²C port and a Smart Card interface, a P1394 interface (I/F) block 690 for connection to an external 1394 device, an extension bus interface (I/F) block 700 to connect peripherals such as additional RS232 ports, display and control panels, external ROM, DRAM, or EEPROM memory, a modem and an extra peripheral, and a traffic controller (TC) block 710 that includes an SRAM(ARM interface (I/F) 712 and a DRAM I/F 714. There may also be seen an internal 32 bit address bus 320 that interconnects the blocks and seen an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chip sets.

Figure 8A:
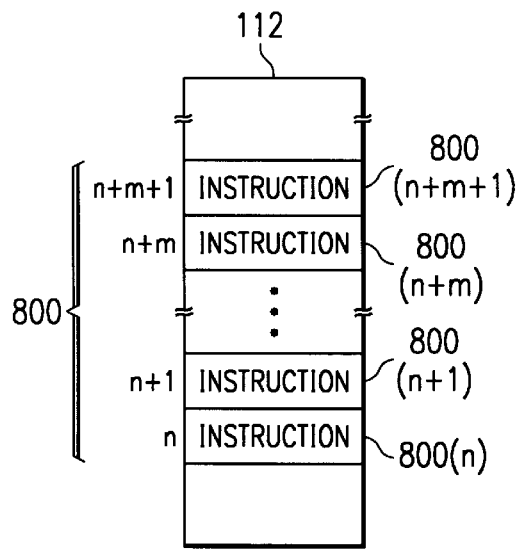
FIG. 8A illustrates a sequence of instructions in a program memory of the device of FIG. 1.
Figure 8B:
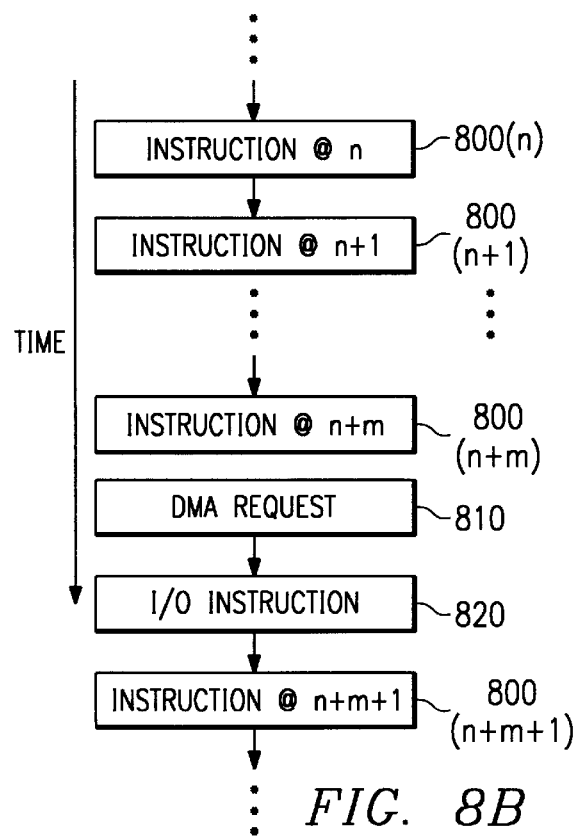
FIG. 8B illustrates a flow of instruction processing of the instruction sequence of FIG. 8A for providing a simple direct memory access transfer according to the present invention.

A novel aspect of the present invention will now be described with respect to FIGS. 8A and 8B, which illustrates a flow of instruction processing for providing a simple direct memory access transfer according to the present invention. As discussed with reference to FIGS. 1, 2, and 3, BPU 110 within device 100 is operable to process a sequence of instructions of various types, including an I/O instruction for transferring a data word between I/O ports 130 and 140 and memory circuits 111 and 121. A sequence of instructions 800(n) to 800(n+m+1) is stored in ROM 112, FIG. 8A, at corresponding addresses (n) to (n+m+1). The instructions are executed in a sequential manner, as illustrated in FIG. 8B, until I/O port 130, for example, receives an input data word. When I/O port 130 receives an input data word that is to be transferred to input buffer area 114 in memory 111, it creates a DMA request event 810 which causes a ghost instruction 820 to be inserted into the sequence of instructions so that BPU 110 performs a DMA transfer by executing ghost instruction 820 immediately after executing instruction 800(n+m). Advantageously, ghost instruction 820 is a likeness of an I/O instruction, so that BPU executes ghost instruction 820 just as if ghost instruction 820 was part of instruction sequence 800. After ghost instruction 820 is executed, BPU 110 continues processing of the sequence of instructions by immediately executing instruction 800(n+m+1). Thus, a word of data received by I/O port 130 is transferred to input buffer 114 with only a one clock cycle overhead, since BPU 11 executes an I/O type instruction in one clock cycle.

Figure 9:
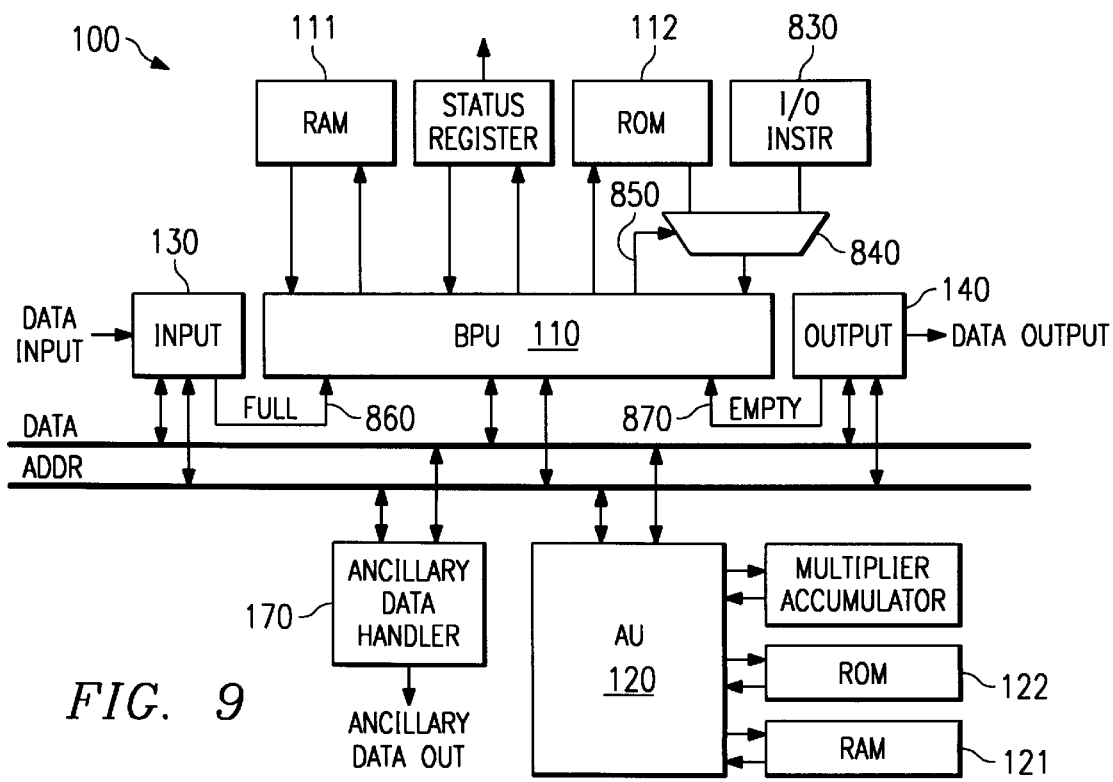
FIG. 9 is a block diagram of the device of FIGS. 1 and 2 showing means for inserting an I/O instruction to form the instruction flow of FIG. 8.

FIG. 9 is a block diagram of the device of FIGS. 1 and 2 showing means for inserting an I/O instruction to form the instruction flow of FIG. 8B. Doppelganger circuitry 830 forms a ghost instruction which is co-mingled with a sequence of instructions from ROM 112. Multiplexor 840 selects instructions from ROM 112 or from doppelganger circuit 830 as directed by control signal 850, which is produced by control circuitry within BPU 110 in response to a DMA request by input port 130 on I/O Request signal 860 or output port 140 on I/O Request signal 870. I/O transfer operation is initiated by a respective I/O block pulsing the I/O Request signals high for one system cycle.

Referring again to FIG. 2, there are two sets of I/O transfer request signals available to be used to perform I/O transfers. Signal set 117a comes from block 130 and signal set 117b comes from block 140 to BPU 110. Each set is comprised of three signals: I/O Request 860 or 870, I/O Direction, and Interrupt. In addition, a one-bit I/O Register address signal 116 comes from BPU 110 to the two I/O blocks containing I/O Registers 131 and 141.

Each I/O block needs to decode the one-bit I/O address signal 116 and a 2-bit rw signal 115. The rw signals are defined in Table 2.

TABLE 2

| CODE | r/w Signals 115 Description |
|---|---|
| 00 | Memory Read by BPU |
| 01 | Memory Write by BPU |
| 10 | I/O Transfer, memory to I/O register |
| 11 | I/O Transfer, I/O register to memory |

If rw 115 indicates a memory to I/O register transfer and the IO Register Address matches the address of the I/O register of the block, the I/O block needs to load the I/O Register with the value on Data Bus 161b. If rw 115 indicates an I/O register to memory transfer and the IO Register Address matches the address of the I/O register, then the I/O block needs to drive Data Bus 161b with the values of the I/O Register.

FIGS. 10A–10D illustrate instruction formats of an I/O instruction for the device of FIG. 1. The I/O instruction of FIG. 10A performs a single cycle transfer from data memory 111 or 121 to or from an I/O mapped register. Device 100 has two I/O mapped registers: a bit-stream input data register 131 which is in input interface 130 and a PCM output data register 141 which is in PCM interface, which are specified by I/O port field 881. The latter supports 24 bit transfers from AU memory 121.

The direction of the transfer is controlled by MEM OP field 881, which is defined in Table 3. If a memory read is specified, then the transfer is from memory to the I/O register. If a write is specified then the transfer is from the register to memory.

TABLE 3

MEM OP Field Codes

| CODE | MNEMONIC | Description |
|------|----------|-------------|
| 00 | NOP | no memory operation |
| 01 | ST | store I/O register to memory |
| 10 | LD | load immed/memory into I/O register |
| 11 | LD | load immed/memory into I/O register |

Figure 10A:
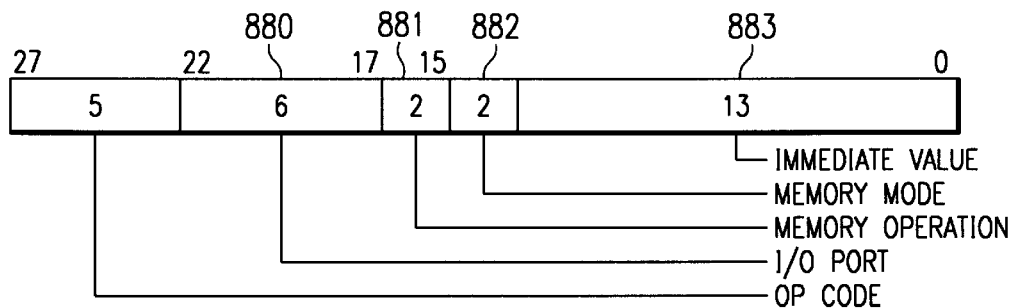
FIGS. 10A–10D illustrate instruction formats of an I/O instruction for the device of FIG. 1.
Figure 10B:
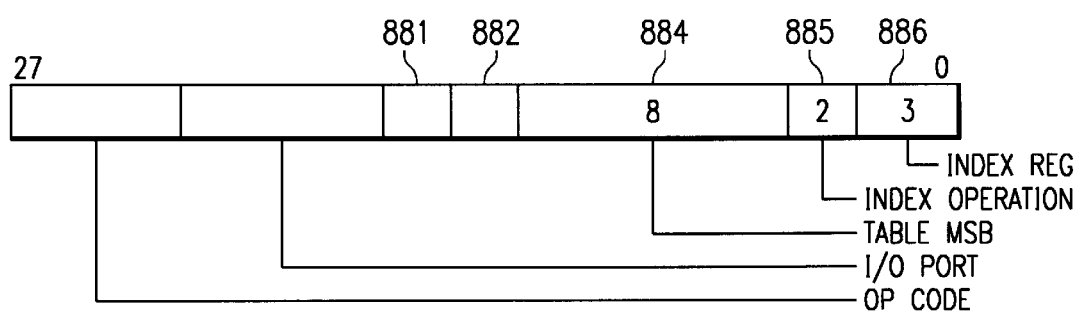

Memory mode field 882 specifies what addressing mode is to be used, as defined in Table 4, Table 5, and Table 6. FIG. 10A illustrates an I/O instruction with an immediate value 883, while FIG. 10B illustrates an I/O instruction with register fields 885 and 886. Although any addressing mode may be specified in the memory field, the most common is an indirect access through an index register with auroincrement. When used for DMA, this has the effect of dedicating the index register to the DMA function. By convention, device 100 dedicates index register IR4 to support input interface 130 and index register IR5 to support PCM interface 140.

TABLE 4

MEM MODE Field 882 Codes

| CODE | MNEMONIC | Description |
|------|----------|-------------|
| 00 | val() | immediate value |
| 01 | mem() | direct memory address |
| 10 | atbl() | register IRx or R0 or R6 |
| 11 | tab() | indirect via register IRx or R0 or R6 |

TABLE 5

INDEX OPERATION Field 883 Codes

| CODE | MNEMONIC | Description |
|------|----------|-------------|
| 00 | none | no modification |
| 01 | ++ | post-increment by one |
| 10 | -- | post-decrement by one |
| 11 | = | post-load with ALU results |

TABLE 6

INDEX REG Field 886 Codes

| CODE | MNEMONIC | Description |
|------|----------|-------------|
| 000 | IR0 | Index Register R0 |
| 001 | IR1 | Index Register R1 |
| 010 | IR2 | Index Register R2 |
| 011 | IR3 | Index Register R3 |
| 100 | IR4 | Index Register R4 |
| 101 | IR5 | Index Register R5 |
| 110 | R0 | ALU Register 0 |
| 111 | BIT | ALU Register 6 (drop 4 lsbs) |

Figure 10C:
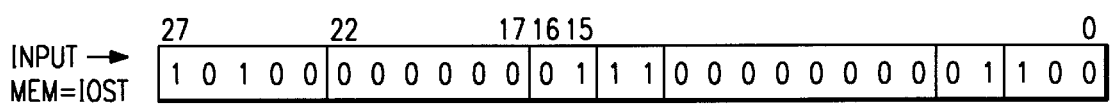
Figure 10D:
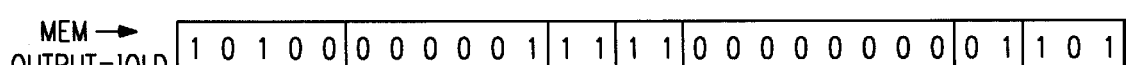

Doppelganger circuit 830 provides preselected likeness of the I/O instructions illustrated in FIGS. 10A and 10B. FIG. 10C illustrates a bit pattern for an IOST instructio which transfers a data word from imput register 131 to memory 111. FIG. 10D illustrates an IOLD instruction that transfers a data word from memory 121 to output register 141.

Figure 11:
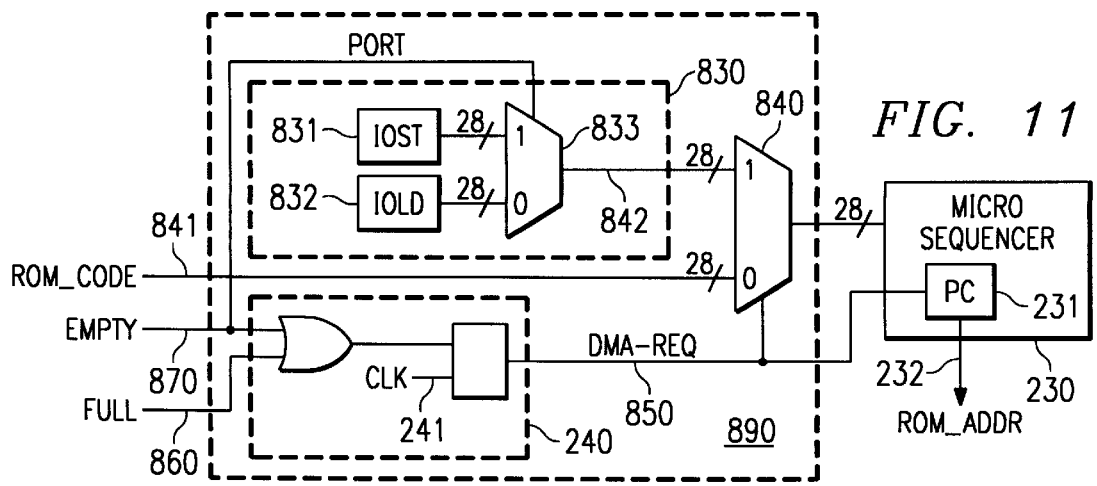
FIG. 11 is a block diagram of a circuit for inserting a ghost I/O instruction into the instruction flow of FIG. 8.

FIG. 11 is a block diagram of a circuit for inserting a ghost I/O instruction into the instruction flow of FIG. 8. Fast interrupt circuitry 890 is operable to insert a ghost instruction into a sequence of instructions being executed by BPU 110 in response to I/O request signals 860 or 870. Doppelganger circuitry 830 is operable to form two ghost instructions, as described above, one for input and one for output. Circuit 831 forms an IOST instruction, as illustrated in FIG. 10C. Circuit 832 forms an IOLD instruction, as illustrated in FIG. 10D. Mux 833 selects the appropriate ghost instruction in response to I/O request signal 870. Request circuitry 240 receives I/O request signals 860 and 870 and forms control signal 850 which is synchronized to a system clock signal 241. Multiplexor 840 has one input connected to ROM 112 for receiving the sequence of instructions via ROM-code bus 841, and a second input connected to Doppelganger circuit 830 for receiving a ghost instruction. The output of mux 840 is connected to microsequencer 230 of BPU 110. Control signal 850 is also connected to program counter 231 in such a manner as to "freeze" an address on ROM address bus 232 for one instruction fetch cycle while a ghost instruction is being inserted into an instruction sequence.

Figure 13:
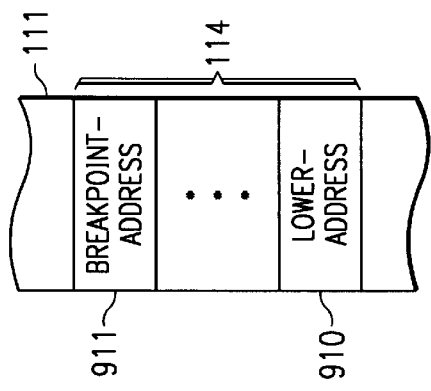
FIG. 13 illustrates a circular buffer formed in a larger memory circuit by using the breakpoint interrupt circuitry of FIG. 12.
Figure 12:
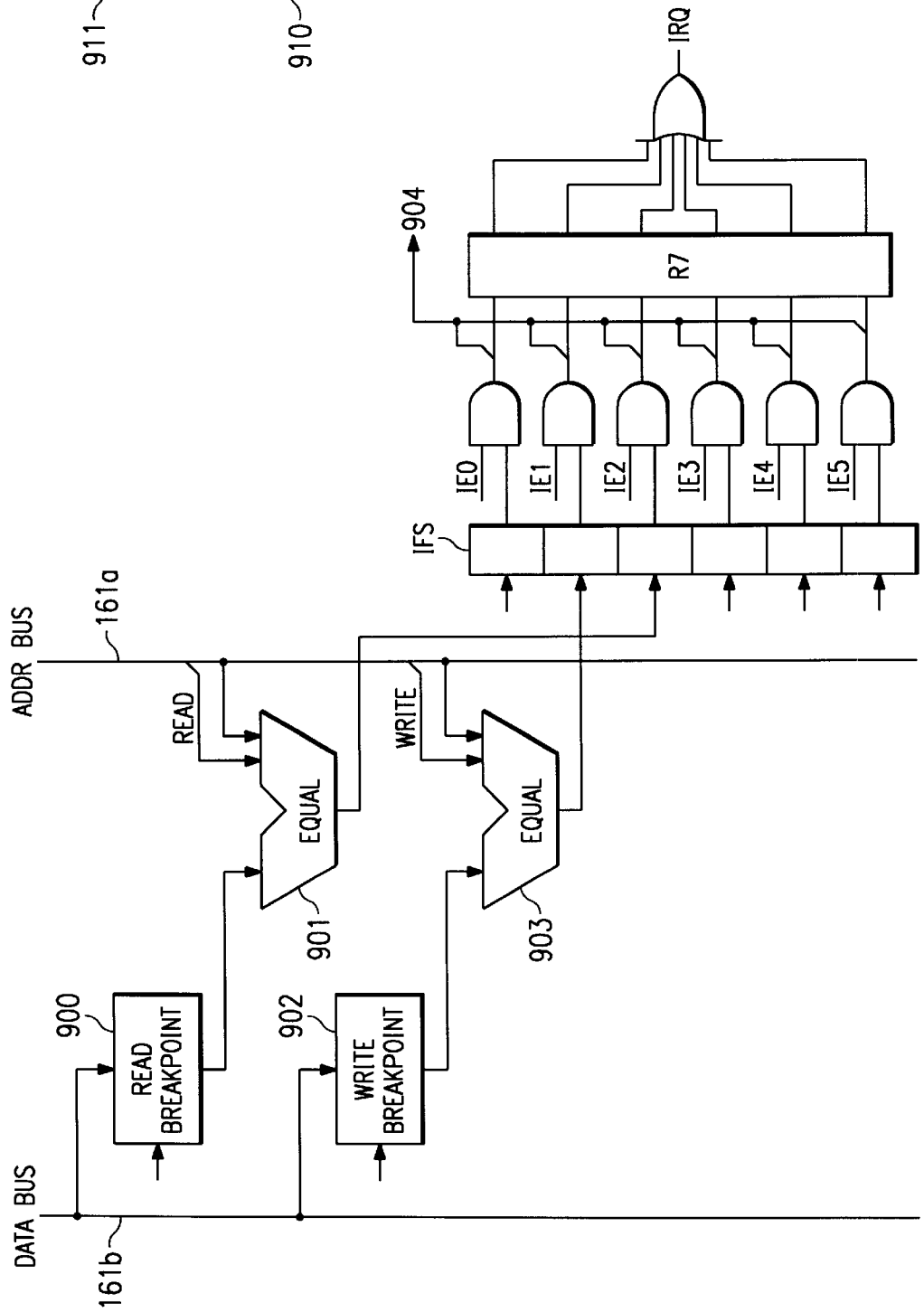
FIG. 12 is a block diagram of breakpoint interrupt circuitry for providing data buffer flow control, according to an aspect of the present invention.

Another aspect of the present invention is illustrated in FIG. 12, which is a block diagram of breakpoint interrupt circuitry for providing data buffer flow control. FIG. 13 illustrates a circular buffer 114 formed in a larger memory circuit 111 by using the breakpoint interrupt circuitry of FIG. 12. As discussed above, DMA transfers will performed to transfer data from input register 131 to input buffer in a linear manner using index register IR4 to hold a memory address for use by ghost instruction 831. Index register IR4 is initialized with a lower address 910 which points to a lower address of input buffer area 114. The choice of this address is rather arbitrary and is selected to be compatible with other data structures in memory 111. Likewise, the size of input buffer is somewhat arbitrary and is selected to match the processing rate of BPU 110 vs. the input rate of data received by input interface 130. Upper address 911 defines an upper address of input buffer area 114.

Referring again to FIG. 12, read breakpoint register 900 is connected to data bus 161b so that it can be loaded with a read breakpoint address. Likewise, write breakpoint register is connected to data bus 161b so that it can be loaded with a write breakpoint address. Both registers are memory mapped in the address space of address bus 161a. A comparator 901 is connected to the output of register 900 and to address bus 161a and is operable to compare addresses placed on the address bus to the value of the read breakpoint address stored in register 900. When an address which is equal to the read breakpoint address is detected during a read transaction, this condition is stored in a bit in interrupt flag shadow register IFS. If interrupt enable signal IE0 is true, then an interrupt request is formed and stored in status register R7. An interrupt request signal IRQ which is the "OR" of all enabled pending interrupts is formed by gate 904 and sent to interrupt logic 240, on FIG. 3. Status register R7 is described in more detail later.

A comparator 903 operates in a similar manner with write breakpoint register 902. A separate bit in status register R7 is used to record a write breakpoint interrupt so that software executing on BPU 110 can respond to read and write breakpoint interrupts appropriately. BPU 110 checks status register R7 in response to an interrupt request in order to determine the source of the interrupt. This is done via bus 907 which is connected to ALU 202, in FIG. 3.

Advantageously, upper address 911 is loaded into write breakpoint register 902 so that when data being transferred from input register 131 to input buffer area 114 is written to upper address 911 a write breakpoint interrupt will occur. A software routine can then respond to this interrupt and re-initialize index register IR4 with lower address 910 in order to treat input buffer area 114 as a circular buffer.

Figure 14:
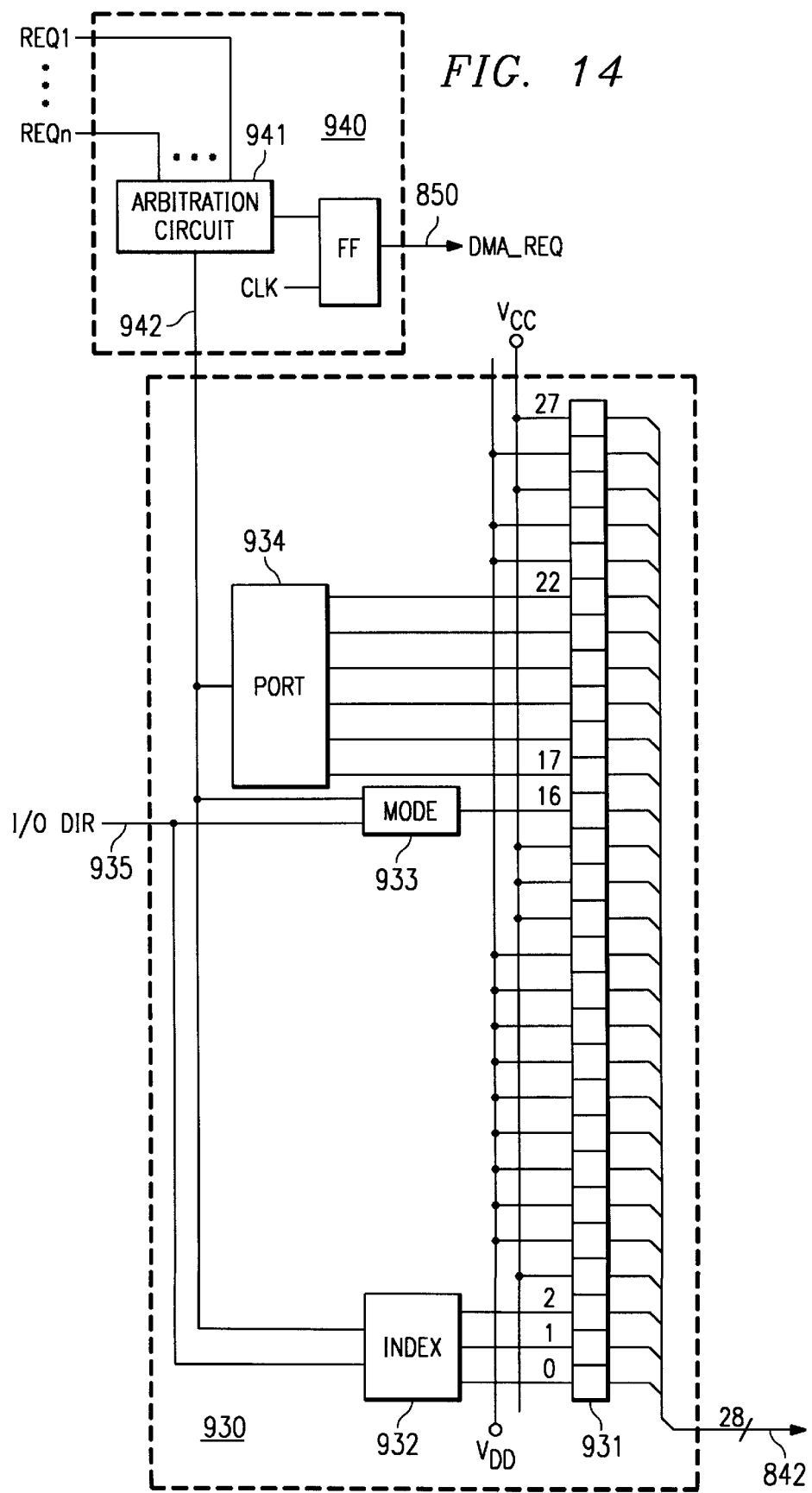
FIG. 14 illustrates another embodiment of a doppelganger circuit for inserting an I/O instruction into the instruction flow of FIG. 8.

FIG. 14 illustrates another embodiment of a doppelganger circuit for inserting an I/O instruction into the instruction flow of FIG. 8. Request circuitry 940 has an arbitration circuit 941 receives two or more I/O request signals REQ1-REQn and selects one according to a priority scheme. A selected port number is output on port signal 942.

Doppelganger circuit 930 has register 931 which holds a ghost instruction. Several bits are connected to a voltage source Vcc which forms bits with a value of logical 1. Several other bits are connected to voltage source Vdd which forms bits with a value of logical 0. Bits 0–2 are connected to index circuitry 932 which forms an index register field in response to a port value on port signal 942 and I/O Direction signal 935. Bit 16 is connected to mode circuitry 933 which is operable to form a mode field which in response to port signal 942 and direction signal 935. Bits 17–22 are connected to port circuitry 934 which is operable to form a port field in response to port signal 942. The ghost instruction so formed is similar to the instructions illustrated in FIGS. 10C and 10D.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual device which may be sold as bare die or packaged. After packaging, finished parts are biased into an operational state and tested for operational functionality.

An alternative embodiment of the novel aspects of the present invention may include other circuitry which are combined with the circuitry disclosed herein in order to reduce the total gate count of the combined functions. Since those skilled in the art are aware of techniques for gate minimization, the details of such an embodiment will not be described herein.

An advantage of the present invention is that a very simple mechanism is provided to transfer between an I/O port and a memory circuit with a minimum of overhead and performance impact on a processor which accesses the memory. Furthermore, portions of the mechanism, such as a general purpose index register, can be used for other purposes if data transfer is not taking place.

Another advantage of the present invention is that hardware complexity and cost is reduced by using a portion of a regular structure, such as an index register file, to form a DMA function.

Another advantage of the present invention is that the breakpoint registers provide fine grain selection of buffer sizes and locations. Breakpoint registers can also be used for other functions, such as indicating different layers of syntax in the data placed in the buffer area, error conditions within the buffer data, etc.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device, comprising:
    a first port for transferring data, the port operable to assert a first request signal;
    a first memory circuit connected to an address bus, the first memory circuit operable to store a plurality of data words;
    an instruction processing unit connected to the first memory circuit and to the first port, the instruction unit operable to process a sequence of instructions, the instruction processing unit further operable to transfer a data word between the first port and the first memory in response to processing a first instruction; and
    fast interrupt circuitry connected to the processing unit, the fast interrupt circuitry operable to insert a ghost instruction into the sequence of instructions in response to the first request signal.

2. The data processing device of claim 1, further comprising:
    a second memory connected to the instruction processing unit, the second memory operable to store the sequence of instructions and
    a program counter connected to the second memory operable to select the sequence of instructions for processing by the instruction processing unit.

3. The data processing device of claim 2, wherein the fast interrupt circuitry further comprises doppelganger circuitry operable to form the ghost instruction, wherein the ghost instruction is a likeness of the first instruction.

4. The data processing device of claim 3, wherein the fast interrupt circuitry further comprises:
    request circuitry to receive the first request, operable to form a control signal responsive to the first request signal; and
    a multiplexor connected between the second memory and the instruction processor, the multiplexor having a first input connected to the second memory, a second input connected to the doppelganger circuitry, an output connected to the instruction processor, and a control input responsive to the control signal.

5. The data processing device of claim 3, further comprising:
    a second port for transferring data, wherein the second port is operable to assert a second request signal; and
    wherein the request circuitry further comprises arbitration circuitry for receiving the first request signal and the second request signal, the arbitration circuitry operable to output a selected port signal.

6. The data processing device of claim 5, wherein the doppelganger circuit further comprises port circuitry operable to form a port field in the ghost instruction responsive to the selected port signal.

7. The data processing device of claim 5, wherein the doppelganger circuit further comprises mode circuitry operable to form a mode field in the ghost instruction responsive to the selected port signal.

8. The data processing device of claim 5, wherein the doppelganger circuit further comprises index circuitry operable to form an index field in the ghost instruction responsive to the selected port signal.

9. The data processing device of claim 3, further comprising:
   a first register operable to hold a breakpoint address; and
   a first comparison circuit connected to the address bus and to the first register with a breakpoint interrupt request output, the first comparison circuit operable to compare an address provided on the address bus with the breakpoint address held in the first register, the first comparison circuit being further operable to assert a breakpoint interrupt request on the interrupt request output when the address is equal to the breakpoint address.

10. A method for responding to an interrupt request in a data processing device, wherein the data processing device is operable to process a sequence of instructions, the method comprising:
   asserting the interrupt request in response to an event relevant to the data processing device;
   inserting a single ghost instruction into the sequence of instructions in response to the interrupt request, wherein the ghost instruction is a likeness of one instruction selected from an instruction set which the data processing device is operable to process; and
   processing the ghost instruction by the data processing device as if the ghost instruction were part of the sequence of instructions, such that the event is responded to by the data processing device while incurring a performance penalty of only one ghost instruction.

11. The method of claim 10, wherein the step of asserting is in response to a data port request to transfer data to or from a memory within the data processing device.

12. The method of claim 11, wherein the step of inserting further comprises forming the ghost instruction to be a likeness of a first instruction which transfers a data word between the data port and the memory.

13. The method of claim 12, wherein the step of forming further comprises tailoring the ghost instruction to transfer the word of data in a direction responsive to the event and to a selected one of a plurality of ports in response to the event.

14. The method of claim 12, wherein the step of forming further comprises tailoring the ghost instruction to transfer the word of data using an autoincrement addressing mode in conjunction with an index register to form an address in the memory.

15. The method of claim 14, further comprising:
   comparing an address of each transfer to the memory to a breakpoint address and interrupting the data processing device when the breakpoint address is transferred;
   initializing the index register with a lower address in response to the interrupt, whereby a circular buffer is formed in the memory between the lower address and the breakpoint address.

16. An audio reproduction system, comprising:
   means for acquiring a stream of data which contains encoded audio data;
   a data device for processing the stream of data connected to the means for acquiring, the data devise operable to form at least one channel of PCM data on an at least one device output terminal;
   a digital to analog converter connected to the output terminal operable to convert the channel of PCM data to an analog audio signal on a D/A output terminal;
   a speaker subsystem connected to the D/A output terminal;
   wherein the data device further comprises:
      first port for transferring data, the port operable to assert a first request signal;
      a first memory circuit connected to an address bus, the first memory circuit operable to store a plurality of data words;
      an instruction processing unit connected to the first memory circuit and to the first port, the instruction unit operable to process a sequence of instructions, the instruction processing unit further operable to transfer a data word between the first port and the first memory in response to processing a first instruction; and
      fast interrupt circuitry connected to the processing unit, the fast interrupt circuitry operable to insert a ghost instruction into the sequence of instructions in response to the first request signal.

17. The audio reproduction system of claim 16, wherein the means for acquiring comprises a satellite broadcast receiver.

18. The audio reproduction system of claim 16, wherein the means for acquiring comprises a digital disk player.

19. The audio reproduction system of claim 16, wherein the means for acquiring comprises a cable TV receiver.

\* \* \* \* \*